(12) United States Patent
Kim et al.

(10) Patent No.: US 12,488,944 B2
(45) Date of Patent: Dec. 2, 2025

(54) MULTILAYER ELECTRONIC COMPONENT

(71) Applicant: SAMSUNG ELECTRO-MECHANICS CO., LTD., Suwon-si (KR)

(72) Inventors: Jun Oh Kim, Suwon-si (KR); Byung Kun Kim, Suwon-si (KR); Yu Hong Oh, Suwon-si (KR); Hyun Ji Yang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 206 days.

(21) Appl. No.: 18/238,146

(22) Filed: Aug. 25, 2023

(65) Prior Publication Data

US 2024/0153710 A1    May 9, 2024

(30) Foreign Application Priority Data

Nov. 4, 2022   (KR) .................. 10-2022-0146267
Dec. 28, 2022  (KR) .................. 10-2022-0187736

(51) Int. Cl.
*H01G 4/30*    (2006.01)
*H01G 4/008*   (2006.01)
*H01G 4/012*   (2006.01)
*H01G 4/12*    (2006.01)
*H01G 4/232*   (2006.01)

(52) U.S. Cl.
CPC .............. *H01G 4/30* (2013.01); *H01G 4/008* (2013.01); *H01G 4/012* (2013.01); *H01G 4/1227* (2013.01); *H01G 4/232* (2013.01)

(58) Field of Classification Search
CPC ......... H01G 4/30; H01G 4/008; H01G 4/012; H01G 4/1227; H01G 4/232; H01G 4/32
See application file for complete search history.

(56) References Cited

U.S. PATENT DOCUMENTS

| | | |
|---|---|---|
| 2013/0321980 A1 | 12/2013 | Suzuki et al. |
| 2015/0155098 A1 | 6/2015 | Yamaguchi et al. |
| 2015/0357121 A1* | 12/2015 | Andrakin ............ H01G 4/224 361/303 |
| 2016/0276102 A1 | 9/2016 | Suzuki et al. |
| 2016/0358713 A1 | 12/2016 | Doi et al. |
| 2017/0025225 A1* | 1/2017 | Andrakin ............ H01G 4/30 |

(Continued)

FOREIGN PATENT DOCUMENTS

| | | | |
|---|---|---|---|
| CN | 1303958 A | * | 7/2001 |
| JP | 61-158127 A | | 7/1986 |

(Continued)

OTHER PUBLICATIONS

European Search Report dated Aug. 26, 2024 issued in the corresponding European Patent Application No. 23193896.0.

*Primary Examiner* — Michael P McFadden
(74) *Attorney, Agent, or Firm* — Morgan, Lewis & Bockius LLP

(57) ABSTRACT

A multilayer electronic component includes: a body including a dielectric layer and an internal electrode; and external electrodes disposed on the body. An average content of indium (In) relative to titanium (Ti) satisfies 0.3 at % or more and 3.8 at % or less in a region of the dielectric layer that is spaced apart by 2 nm from an interface thereof with the internal electrode.

24 Claims, 9 Drawing Sheets

(56) References Cited

U.S. PATENT DOCUMENTS

| | | |
|---|---|---|
| 2017/0271083 A1 | 9/2017 | Makino et al. |
| 2018/0204678 A1* | 7/2018 | Yamaguchi |
| 2020/0058442 A1* | 2/2020 | Cha .................. H01G 4/12 |
| 2021/0027943 A1* | 1/2021 | Cha .................. H01G 4/1218 |
| 2023/0207211 A1 | 6/2023 | Oh et al. |

FOREIGN PATENT DOCUMENTS

| | | | |
|---|---|---|---|
| JP | 2012-033291 A | 2/2012 | |
| JP | WO2012/111592 A1 | 8/2012 | |
| JP | WO2014/024538 A1 | 2/2014 | |
| JP | WO2015/087688 A1 | 6/2015 | |
| JP | 2016150872 A * | 8/2016 | .......... C04B 35/468 |
| JP | 2017-005019 A | 1/2017 | |
| JP | 2017-168746 A | 9/2017 | |
| JP | 2018-117051 A | 7/2018 | |
| JP | 2021-005538 A | 1/2021 | |
| KR | 10-2023-0099932 A | 7/2023 | |

* cited by examiner

MULTILAYER ELECTRONIC COMPONENT

CROSS-REFERENCE TO RELATED APPLICATION(S)

This application claims benefit of priority to Korean Patent Application Nos. 10-2022-0146267 filed on Nov. 4, 2022 and 10-2022-0187736 filed on Dec. 28, 2022 in the Korean Intellectual Property Office, the disclosures of which are incorporated herein by reference in their entireties.

TECHNICAL FIELD

The present disclosure relates to a multilayer electronic component.

BACKGROUND

A multilayer ceramic capacitor (MLCC), one of multilayer electronic components, may be a chip-type condenser which is mounted on a printed circuit board of various electronic products, such as an imaging device such as a liquid crystal display (LCD) or a plasma display panel (PDP), a computer, a smartphone or a mobile phone, to serve to charge or discharge electricity therein or therefrom.

Such a multilayer ceramic capacitor is small, has high capacitance, may be easily mounted on a circuit board, and thus may be used as a component of various electronic apparatuses, such that there has been increasing demand for a multilayer ceramic capacitor to have a smaller size and higher capacitance as each of various electronic devices such as a computer and a mobile device has a smaller size and higher output.

In accordance with this trend of the smaller size and the higher performance, it has become important for the multilayer ceramic capacitor to have an increased capacitance per unit volume. In order for the smaller size and higher capacitance of the multilayer ceramic capacitor, the thicknesses of dielectric layers and internal electrodes need to be reduced to increase the number of stacked layers. In addition, the internal electrode may need to have higher connectivity and a uniform thickness in order to improve reliability of the multilayer ceramic capacitor.

However, when fine-grained metal powder particles are used to make the thickness of the internal electrode smaller than before, a sintering-shrinkage initiation temperature may be lower, thus increasing discrepancy in a shrinkage behavior with that of the dielectric layer, which may result in internal electrode agglomeration or internal electrode disconnection.

In addition, the capacitor may be required to secure higher reliability in various environments as application thereof to an automotive electric component or the like is increased. In order to secure higher reliability, it is important to disperse concentration of an electrical field by improving the connectivity and thickness uniformity of the internal electrode. In addition, the capacitor may be required to have an excellent high-temperature load life in order to secure higher reliability in the various environments.

SUMMARY

An aspect of the present disclosure may provide a multilayer electronic component having higher reliability.

Another aspect of the present disclosure may provide a multilayer electronic component having improved capacitance.

Another aspect of the present disclosure may provide a multilayer electronic component having an excellent high-temperature load life.

Another aspect of the present disclosure may provide a multilayer electronic component in which internal electrode agglomeration or internal electrode disconnection is suppressed.

However, the present disclosure is not limited to the description above, and may be more readily understood in the description of exemplary embodiments of the present disclosure.

According to an aspect of the present disclosure, a multilayer electronic component may include: a body including a dielectric layer and an internal electrode; and external electrodes disposed on the body. An average content of indium (In) relative to titanium (Ti) satisfies 0.3 at % or more and 3.8 at % or less in a region of the dielectric layer that is spaced apart by 2 nm from an interface thereof with the internal electrode.

According to another aspect of the present disclosure, a multilayer electronic component may include: a body including a dielectric layer and an internal electrode; and external electrodes disposed on the body. An average content of indium (In) relative to nickel (Ni) satisfies 0.45 at % or more and 1.39 at % or less in a region of the internal electrode that is spaced apart by 2 nm from an interface thereof with the dielectric layer.

According to another aspect of the present disclosure, a multilayer electronic component may include: a body including a dielectric layer and an internal electrode; and an external electrode disposed on the body to connect to the internal electrode. Indium (In) is disposed in the dielectric layer or the internal electrode. $\sigma te/te$ is 0.2 or less in which te indicates an average thickness of the internal electrode and $\sigma te$ indicates a standard deviation in the thickness of the internal electrode.

According to another aspect of the present disclosure, a multilayer electronic component may include: a body including a dielectric layer and an internal electrode; and an external electrode disposed on the body to connect to the internal electrode. Indium (In) is disposed in the dielectric layer or the internal electrode. The internal electrode includes a plurality of conductive parts and a disconnection part disposed between the adjacent conductive parts, and connectivity in the internal electrode, which is a ratio of sum of lengths of the plurality of conductive parts to a total length of the internal electrode, is 85% or more.

BRIEF DESCRIPTION OF DRAWINGS

The above and other aspects, features and advantages of the present disclosure will be more clearly understood from the following detailed description taken in conjunction with the accompanying drawings, in which:

FIG. 7A is an image acquired by mapping a nickel (Ni) element by using the STEM-EDS, FIG. 7B is an image acquired by mapping a titanium (Ti) element by using the STEM-EDS, and FIG. 7C is an image acquired by mapping an indium (In) element by using the STEM-EDS;

FIG. 9A is an image acquired by mapping a nickel (Ni) element by using the STEM-EDS, FIG. 9B is an image acquired by mapping a titanium (Ti) element by using the STEM-EDS, and FIG. 9C is an image acquired by mapping an indium (In) element by using the STEM-EDS.

DETAILED DESCRIPTION

Figure 1:
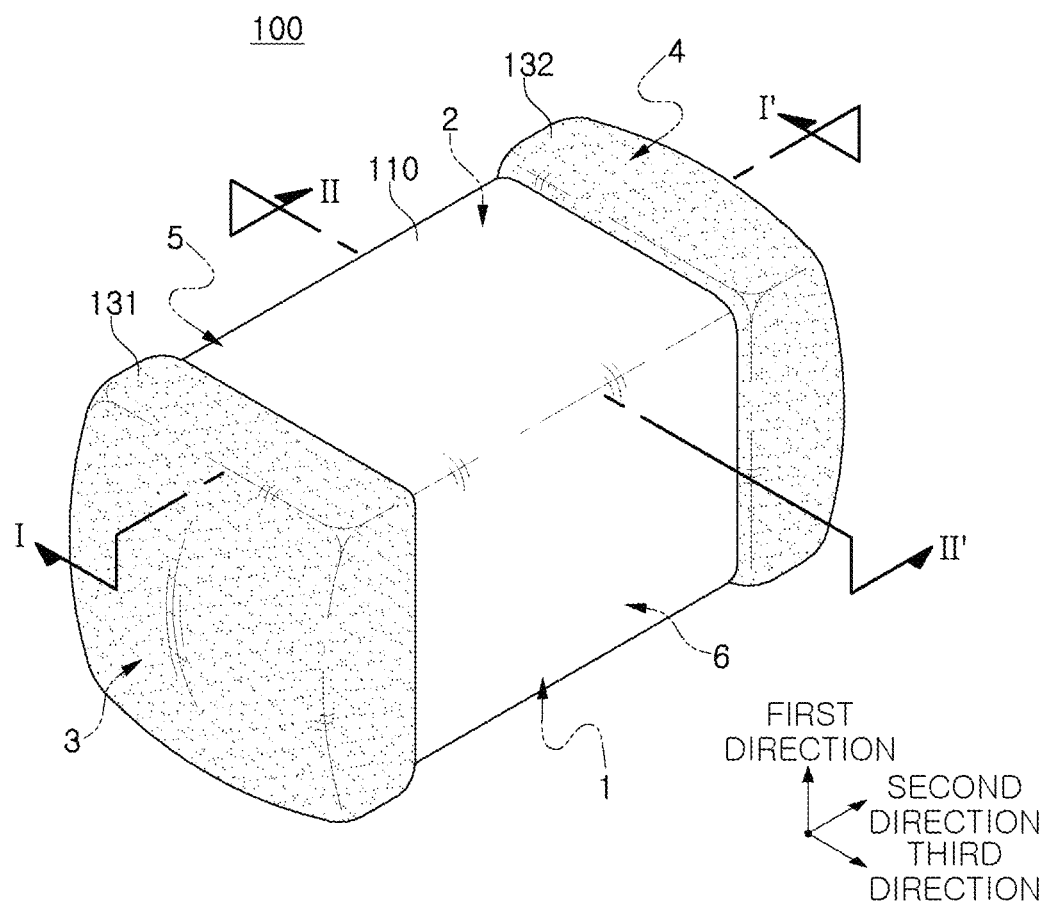
FIG. 1 schematically illustrates a perspective view of a multilayer electronic component according to an exemplary embodiment of the present disclosure.

Hereinafter, exemplary embodiments of the present disclosure will now be described in detail with reference to the accompanying drawings.

In the drawings, a first direction may indicate a stack direction or a thickness (T) direction, a second direction may indicate a length (L) direction, and a third direction may indicate a width (W) direction.

Multilayer Electronic Component

FIG. 1 schematically illustrates a perspective view of a multilayer electronic component according to an exemplary embodiment of the present disclosure.

Figure 2:
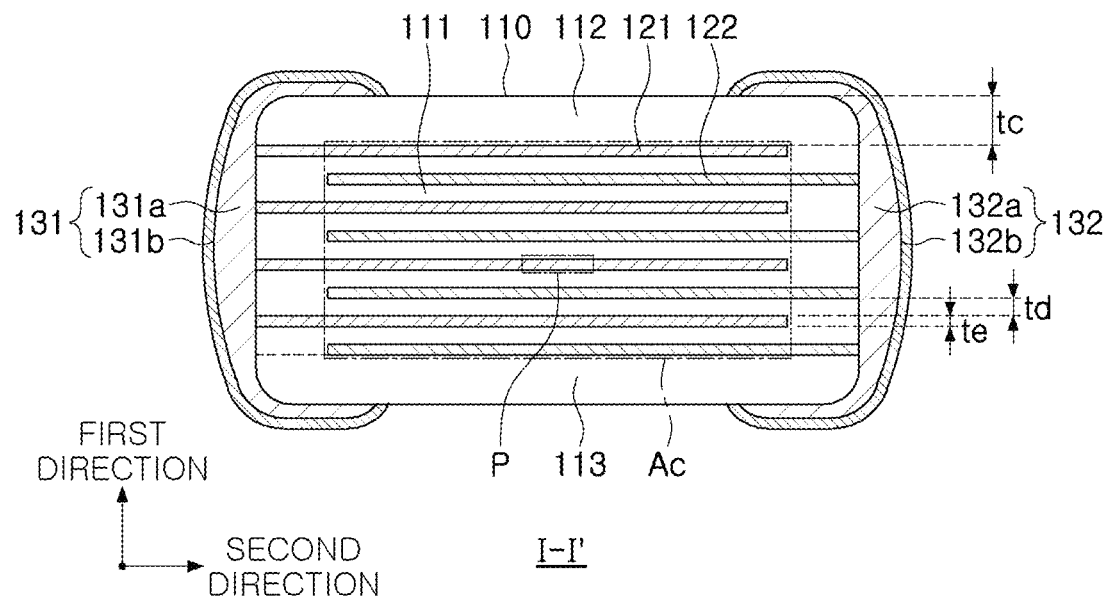
FIG. 2 is a schematic cross-sectional view taken along line I-I' of FIG. 1.

FIG. 2 is a schematic cross-sectional view taken along line I-I' of FIG. 1.

Figure 3:
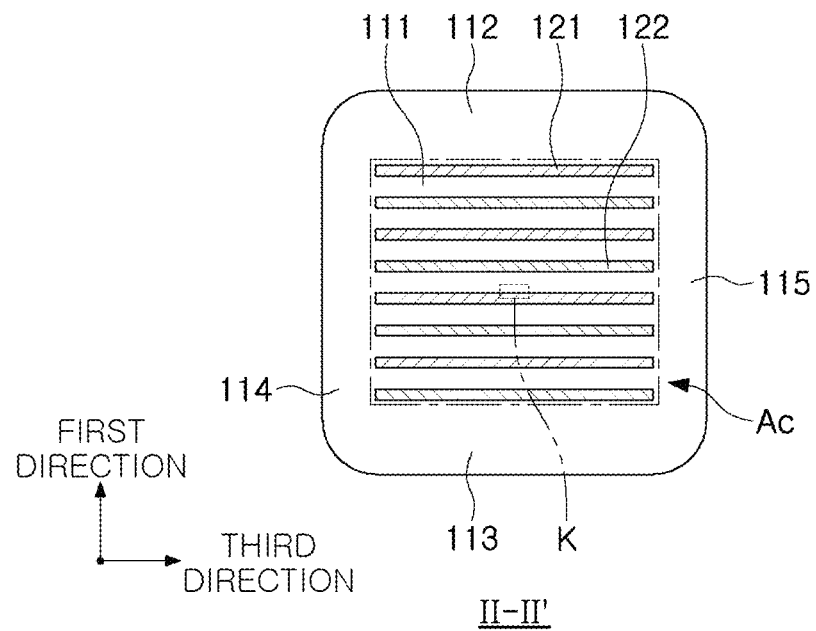
FIG. 3 is a schematic cross-sectional view taken along line II-II' of FIG. 1.

FIG. 3 is a schematic cross-sectional view taken along line II-II' of FIG. 1.

Figure 4:
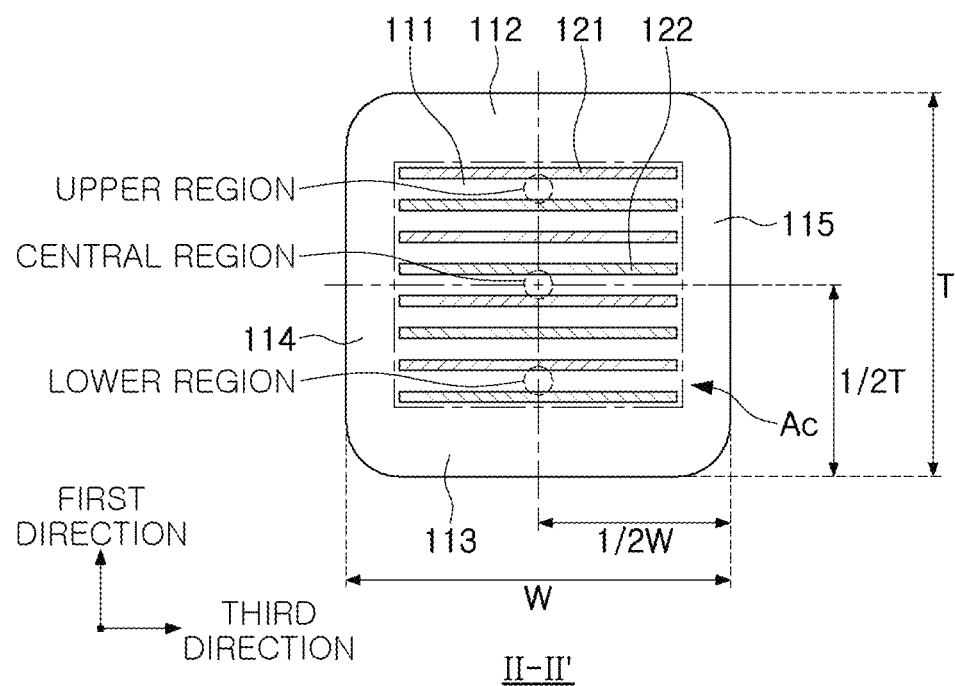
FIG. 4 is a cross-sectional view taken along line II-II' of FIG. 1 illustrating a measurement region of the present disclosure.

FIG. 4 is a cross-sectional view taken along line II-II' of FIG. 1 illustrating a measurement region of the present disclosure.

Figure 5:
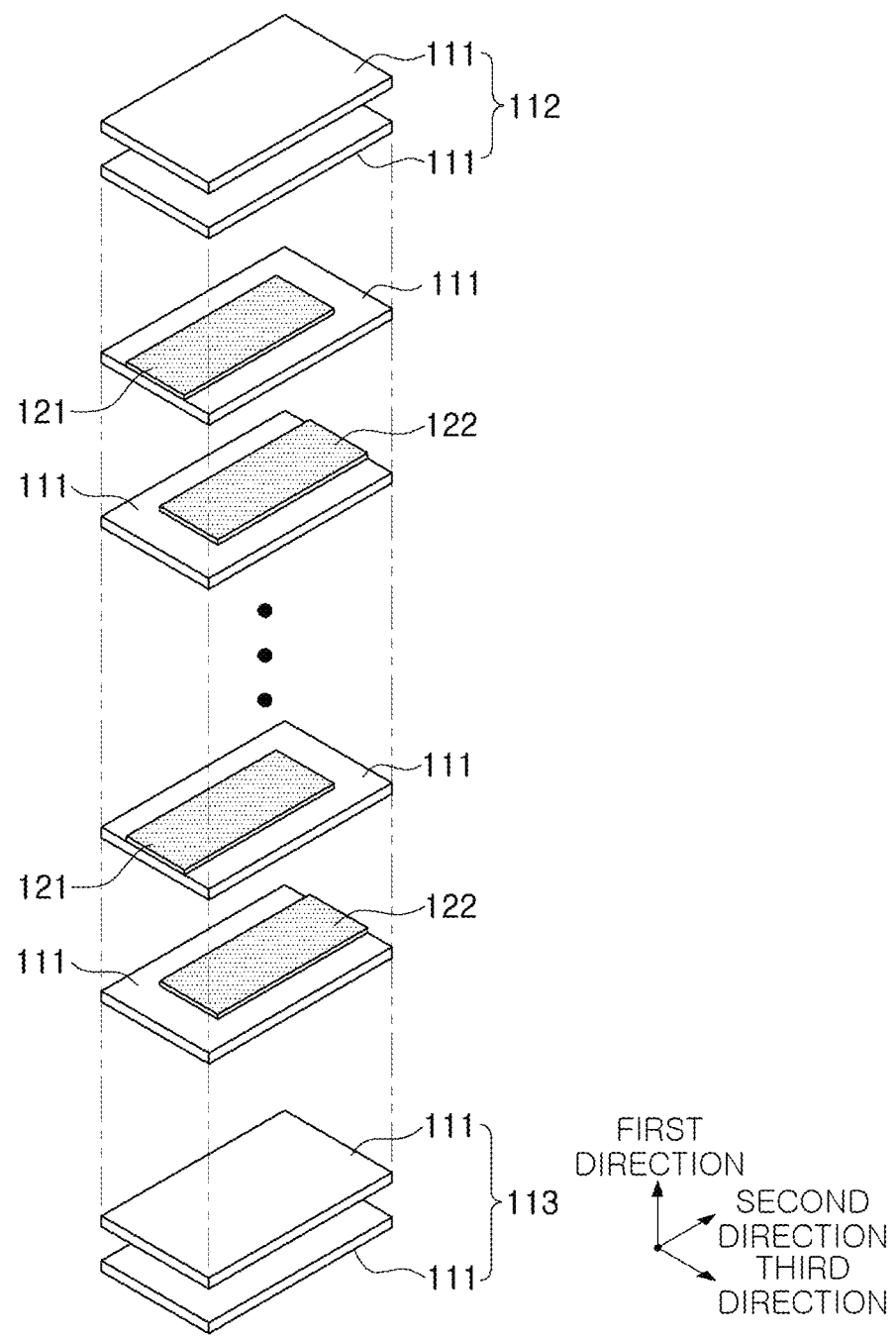
FIG. 5 is an exploded perspective view showing a disassembled body of FIG. 1.

FIG. 5 is an exploded perspective view showing a disassembled body of FIG. 1.

Figure 6:
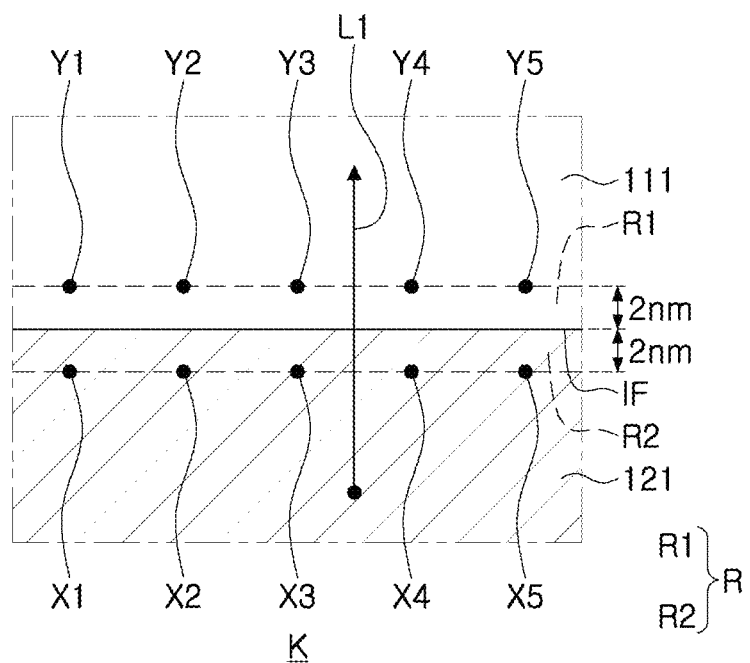
FIG. 6 is an enlarged view of a region K of FIG. 3.

FIG. 6 is an enlarged view of a region K of FIG. 3.

Hereinafter, a multilayer electronic component 100 according to an exemplary embodiment of the present disclosure is described with reference to FIGS. 1 through 6. In addition, a multilayer ceramic capacitor (hereinafter, referred to as 'MLCC') is described as an example of the multilayer electronic component, the present disclosure is not limited thereto, and the capacitor may also be applied to various multilayer electronic components using a ceramic material, such as an inductor, a piezoelectric element, a varistor, or a thermistor.

The multilayer electronic component 100 according to an exemplary embodiment of the present disclosure may include: a body 110 including a dielectric layer 111 and internal electrodes 121 and 122 each alternately disposed with the dielectric layer 111; and external electrodes 131 and 132 disposed on the body 110. An average content of indium (In) relative to titanium (Ti) may satisfy 0.3 at % or more and 3.8 at % or less in a region of the dielectric layer that is spaced apart by 2 nm from an interface thereof with one of the internal electrodes 121 and 122.

According to an exemplary embodiment of the present disclosure, the average content of indium (In) relative to titanium (Ti) in the region of the dielectric layer that is spaced apart by 2 nm from an interface thereof with the one of the internal electrodes 121 and 122 may satisfy 0.3 at % or more and 3.8 at % or less, thus suppressing internal electrode agglomeration or internal electrode disconnection to thus improve reliability of the multilayer electronic component.

Hereinafter, the description specifically describes each component of the multilayer electronic component 100.

The body 110 may include the dielectric layer 111 and the internal electrode 121 or 122, which are alternately stacked on each other.

The body 110 is not limited to a particular shape, and may have a hexahedral shape or a shape similar to the hexahedral shape, as shown in the drawings. The body 110 may not have the hexahedral shape having perfectly straight lines due to shrinkage of ceramic powder particles included in the body 110 in a sintering process, and have the substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

Marginal regions where none of the internal electrodes 121 and 122 is disposed may overlap each other on the dielectric layer 111, and a step difference may thus occur due to thicknesses of the internal electrodes 121 and 122. Accordingly, corners connecting the first surface and the third to fifth surfaces to each other or corners connecting the second surface and the third to the fifth surface to each other may shrink toward the center of the body 110 in the first direction, based on the first surface or the second surface. Alternatively, due to a shrinkage behavior in the sintering process of the body, corners connecting the first surface 1 and the third to sixth surfaces 3, 4, 5 and 6 to each other, or corners connecting the second surface 2 and the third to the sixth surfaces 3, 4, 5 and 6 to each other may shrink toward the center of the body 110 in the first direction, based on the first surface or the second surface. Alternatively, a separate process may be performed to round the corners connecting respective surfaces of the body 110 to each other in order to prevent a chipping defect or the like, and the corners connecting the first and third to sixth surfaces to each other, or the corners connecting the second surface and the third to sixth surfaces to each other may thus each have a round shape.

Meanwhile, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both sides of a capacitance formation part Ac in the third direction (or the width direction) to form margin parts 114 and 115. In this case, the corner connecting the first surface and the fifth or sixth surface to each other and the corner connecting the second surface and the fifth or sixth surface to each other may not shrink.

The plurality of dielectric layers 111 included in the body 110 may be in a sintered state, and adjacent dielectric layers 111 may be integrated with each other for boundaries therebetween may not be readily apparent without using a scanning electron microscope (SEM). The number of stacked dielectric layers does not need to be particularly limited, and may be determined by considering a size of the multilayer electronic component. For example, the body may be formed by stacking 400 or more dielectric layers on each other.

The dielectric layer 111 may be formed by preparing a ceramic slurry including ceramic powder particles, an organic solvent and a binder, applying the slurry on a carrier film and drying the same to prepare a ceramic green sheet, and then sintering the ceramic green sheet. The ceramic powder particles are not particularly limited as long as the powers may acquire sufficient capacitance, and may use, for example, barium titanate-based ($BaTiO_3$)-based powder particles. For a more specific example, the ceramic powder particles may be one or more of $BaTiO_3$ or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$).

According to an exemplary embodiment of the present disclosure, an average content of indium (In) relative to titanium (Ti) may satisfy 0.3 at % or more and 3.8 at % or less in a region Y1, Y2, Y3, Y4, or Y5 of the dielectric layer 111 that is spaced apart by 2 nm from an interface IF with the internal electrode 121 or 122. In this way, a region of the dielectric layer having a high content of indium (In) may be disposed in a region of the dielectric layer that is adjacent to the interface, thereby improving a bonding strength of the interface between the dielectric layer and the internal electrode, and this region may act as a kind of semiconductor barrier hindering movement of electrons from the internal electrode to the dielectric layer or from the dielectric layer to the internal electrode, thereby improving both the capacitance and high-temperature load life of the multilayer electronic component.

Here, a content of indium (In) relative to titanium (Ti) may indicate an atomic ratio, and be calculated as (number of atoms of In)/(number of atoms of Ti)*100, and a unit of the content may be at %. In addition, the average content of indium (In) relative to titanium (Ti) may be an average value of the content of indium (In) relative to titanium (Ti) that is measured in at least five regions among the regions of the dielectric layer 111 that are spaced apart by 2 nm from an interface thereof with the internal electrode 121 or 122. Hereinafter, Y may indicate the average content of indium (In) relative to titanium (Ti) in the region of the dielectric layer 111 that is spaced apart by 2 nm from an interface thereof with the internal electrode 121 or 122.

In a case in which Y is less than 0.3 at %, the high-temperature load life of the multilayer electronic component may be lower while its capacitance is higher compared to a case in which Y is zero at %. Therefore, Y may be 0.3 at % or more, and may be 1.3 at % or more to further improve the capacitance and high-temperature load life of the multilayer electronic component.

On the other hand, in a case in which Y is more than 3.8 at %, the capacitance of the multilayer electronic component may be lower compared to a case in which Y is zero at %. Therefore, Y may be 3.8 at %, and may be 3.3 at % or less to further improve the capacitance of the multilayer electronic component.

Accordingly, Y may be 0.3 at % or more and 3.8 at % or less, and may be 1.3 at % or more and 3.3 at % or less.

Referring to FIG. 6, the following may be an example of a method of measuring Y: Y may be measured by polishing the multilayer electronic component to its center in the second direction to expose its cross sections in the first and third directions, then selecting the five regions Y1, Y2, Y3, Y4, and Y5 of the dielectric layer 111 that are spaced apart by 2 nm from the interface IF with the internal electrodes 121 and 122, performing a quantitative analysis of indium (In) and titanium (Ti) by using an energy-dispersive X-ray spectroscopy (STEM-EDS) in each of the five regions Y1, Y2, Y3, Y4, and Y5 to acquire content values of indium (In) relative to titanium (Ti), and then finding an average value of these values. In addition, a more general average value may be acquired by selecting four different dielectric layers, and then measuring five regions in each dielectric layer to thus acquire an average value of a total of twenty measured values.

In addition, the interface IF between the dielectric layer 111 and the internal electrode 121 or 122 may indicate a point at which contrast of Fresnel fringes is changed to be almost symmetrical on both sides of the interface when a focus is changed by observing the Fresnel fringes, i.e. lines appearing on both the sides, by using a scanning transmission electron microscope (STEM).

Meanwhile, there is no need to particularly limit a method for controlling the average content of indium (In) relative to titanium (Ti) in the region of the dielectric layer 111 that is spaced apart by 2 nm from an interface thereof with the internal electrode 121 or 122.

For a specific example, the average content of indium (In) relative to titanium (Ti) may be controlled in the region of the dielectric layer 111 spaced apart by 2 nm from an interface thereof with the internal electrode 121 or 122 by adjusting a content of indium (In) relative to nickel (Ni) added to a conductive paste and adjusting an oxygen partial pressure condition during the sintering. Indium (In) is an element having a stronger oxidation tendency than nickel (Ni). When indium (In) is added as a material of the internal electrode and the internal electrode is then sintered, one portion thereof may be oxidized and diffused to the dielectric layer to be replaced by a site of titanium (Ti) such as $BaTiO_3$, and another portion thereof may not be oxidized and form an alloy with nickel (Ni) remaining in the internal electrode. In addition, a portion of indium (In) diffused from the internal electrode to the dielectric layer may be trapped in the interface between the dielectric layer and the internal electrode, and a region having a high content of indium (In) may be formed in the interface and a region of the internal electrode that is adjacent to the interface.

In an exemplary embodiment, the dielectric layer 111 may include tin (Sn). In addition, an average content of tin (Sn) relative to titanium (Ti) may satisfy 0.02 at % or more and 0.42 at % or less in the region of the dielectric layer 111 that is spaced apart by 2 nm from the interface IF with the internal electrode 121 or 122. Tin (Sn) has a low melting point to thus allow indium (In) to be easily diffused into the interface IF, and to allow indium (In) to be easily trapped in the interface IF, thereby easily improving the capacitance and high-temperature load life of the multilayer electronic component. However, the above effect may be insufficient when an average content of tin (Sn) relative to titanium (Ti) is less than 0.02 at % in the region of the dielectric layer 111 that is spaced 2 nm from the interface IF with the internal electrode 121 or 122. On the other hand, the content of indium (In) trapped in the interface may be reduced by excessive diffusion of indium (In) when the content of indium (In) is more than 0.42 at %.

In an exemplary embodiment, the dielectric layer 111 may include dysprosium (Dy). Dysprosium (Dy) may improve the high-temperature load life and permittivity of the multilayer electronic component. In addition, an average content of dysprosium (Dy) relative to titanium (Ti) may satisfy 3 at % or more and 7 at % or less in the region of the dielectric layer 111 that is spaced apart by 2 nm from the interface IF with the internal electrode 121 or 122. It is thus possible to more easily improve the high-temperature load life of the multilayer electronic component and improve the permittivity.

In an exemplary embodiment, the dielectric layer 111 may include $Ba(Ti_{1-z}In_z)O_3$ (0<z<1). Trivalent indium (+3 In) can be replaced by the site of titanium (Ti) such as $BaTiO_3$, which is a main component of the dielectric layer, and when replaced by the site of titanium (Ti), indium (In) may act as an acceptor to improve the reliability of the multilayer electronic component. However, the main components of the dielectric layer 111 may be one or more of $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), and $Ba(Ti_{1-y}Zr_y)O_3$ (0<y<1), and indium (In) may be diffused into the dielectric layer 111 and replaced by the site of titanium (Ti), which is one of the main components. The dielectric layer may not include $Ba(Ti_{1-z}In_z)O_3$ (0<z<1) as the main component.

Meanwhile, the dielectric layer 111 may further include various elements other than the above-mentioned elements. For example, the dielectric layer 111 may further include one or more of calcium (Ca), manganese (Mn), vanadium (V), chromium (Cr), iron (Fe), nickel (Ni), cobalt (Co), copper (Cu), zinc (Zn), magnesium (Mg), silicon (Si), and a rare earth element (RE).

According to the present disclosure, it is possible to prevent lower reliability of the multilayer electronic component even when each of the plurality of dielectric layers 111 has a smaller thickness, and it is possible to further improve the reliability of the multilayer electronic component in case that the dielectric layer has a greater thickness. Therefore, an average thickness td of the dielectric layer 111 does not need to be particularly limited, and may be arbitrarily set based on the desired characteristic or usage of the multilayer electronic component. For a specific example, the average thickness td of the dielectric layer 111 may be 300 nm or more and 10 µm or less. In addition, the average thickness td of at least one of the plurality of dielectric layers 111 may be 300 nm or more and 10 µm or less.

Here, the average thickness td of the dielectric layer 111 may indicate an average size of the dielectric layer 111 in the first direction that is disposed between the internal electrodes 121 and 122. The average thickness of the dielectric layer 111 may be measured by scanning cross sections of the body 110 in the first and second directions by using the scanning electron microscope with a magnification of 10,000. In more detail, an average thickness value of the dielectric layer 111 may be acquired by averaging the thickness of one dielectric layer measured at a plurality of points, for example, at thirty equally spaced points in the second direction. The thirty equally spaced points may be designated in the capacitance formation part Ac described below. In addition, it is possible to acquire a more general average thickness of the dielectric layer 111 when measuring its average value by extending a measurement target of the average value to ten dielectric layers 111.

The body 110 may further include the capacitance formation part Ac disposed in the body 110, and forming the capacitance of the multilayer electronic component by including the first and second internal electrodes 121 and 122 disposed to oppose each other while having the dielectric layer 111 interposed therebetween, and include cover parts 112 and 113 disposed on upper and lower surfaces of the capacitance formation part Ac in the first direction.

In addition, the capacitance formation part Ac may be a part that contributes to forming the capacitance of the capacitor, and formed by repeatedly stacking the plurality of first and second internal electrodes 121 and 122 on each other while having the dielectric layer 111 interposed therebetween.

The cover parts 112 and 113 may include the upper cover part 112 disposed on the upper surface of the capacitance formation part Ac in the first direction and the lower cover part 113 disposed on the lower surface of the capacitance formation part Ac in the first direction.

The upper cover part 112 and the lower cover part 113 may respectively be formed by stacking one dielectric layer or two or more dielectric layers on the upper and lower surfaces of the capacitance formation part Ac in the thickness direction, and may basically prevent the internal electrodes from being damaged due to physical or chemical stress.

The upper or lower cover part 112 or 113 may include no internal electrode, and include the same material as the dielectric layer 111.

That is, the upper or lower cover part 112 or 113 may include the ceramic material and include, for example, a barium titanate ($BaTiO_3$)-based ceramic material.

Meanwhile, an average thickness of the cover part 112 or 113 may not need to be particularly limited. For example, a thickness tc of the cover part 112 or 113 may be 10 to 300 µm. However, the thickness tc of the cover part 112 or 113 may be 15 µm or less in order for the multilayer electronic component to more easily have a smaller size and a higher capacitance.

The average thickness tc of the cover part 112 or 113 may indicate its size in the first direction, and may have a value acquired by averaging the sizes of the cover part 112 or 113 in the first direction, measured at five equally spaced points on upper and lower surfaces of the capacitance formation part Ac.

In addition, the margin part 114 or 115 may be disposed on each side surface of the capacitance formation part Ac.

The margin parts 114 and 115 may be the first margin part 114 disposed on the fifth surface 5 of the body 110 and the second margin part 115 disposed on the sixth surface 6 of the body 110. That is, the margin part 114 or 115 may be disposed on an end surface of the ceramic body 110 in the width direction.

As shown in FIG. 3, the margin part 114 or 115 may indicate a region in an interface between an end of the first or second internal electrode 121 or 122 and the body 110, based on the cross sections of the body 110 cut in the width and thickness (W-T) directions.

The margin part 114 or 115 may basically prevent the internal electrode from being damaged due to the physical or chemical stress.

The margin part 114 or 115 may be disposed by forming the internal electrode by applying the conductive paste on the ceramic green sheet except for its portion where the margin part is to be disposed.

Alternatively, in order to suppress the step difference caused by the internal electrodes 121 and 122, the margin part 114 or 115 may be formed by stacking the internal electrodes on each other, then cutting the internal electrodes to be exposed to the fifth or sixth surface 5 or 6 of the body, and then stacking one dielectric layer or two or more dielectric layers on each side surface of the capacitance formation part Ac in the third direction (or the width direction).

Meanwhile, a width of the margin part 114 or 115 may not need to be particularly limited. For example, the width of the margin part 114 or 115 may be 5 to 300 μm. However, an average width of the margin part 114 or 115 may be 15 μm or less in order for the multilayer electronic component to more easily have the smaller size and the higher capacitance.

The average width of the margin part 114 or 115 may be an average size of a region where the internal electrode is spaced apart from the fifth surface in the third direction or an average size of an area where the internal electrode is spaced apart from the sixth surface in the third direction, and may be an average value of a size of the margin part 114 or 115 in the third direction, measured at five equally spaced points on the side surface of the capacitance formation part Ac.

Accordingly, in an exemplary embodiment, 15 μm or less may be the average size of the region where the internal electrode 121 or 122 is spaced apart from the fifth or sixth surface in the third direction.

The internal electrode 121 or 122 may be the first internal electrode 121 or the second internal electrode 122. The first and second internal electrodes 121 and 122 may be alternately disposed to oppose each other interposing the dielectric layer 111 included in the body 110 therebetween, and may respectively be exposed to the third and fourth surfaces 3 and 4 of the body 110.

The first internal electrode 121 may be spaced apart from the fourth surface 4 and be exposed to (or extend from or be in contact with) the third surface 3, and the second internal electrode 122 may be spaced apart from the third surface 3 and be exposed to (or extend from or be in contact with) the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be spaced apart from the fourth surface 4 by a predetermined distance, and the second internal electrode 122 may be spaced apart from the third surface 3 by the predetermined distance. In addition, the first or second internal electrode 121 or 122 may be disposed to be spaced apart from the fifth or sixth surface of the body 110.

In an exemplary embodiment, the internal electrode 121 or 122 may include nickel (Ni) and indium (In). Here, an average content of indium (In) relative to nickel (Ni) may satisfy 0.45 at % or more and 1.39 at % or less in a region of the internal electrode 121 or 122 that is spaced apart by 2 nm from the interface IF with the dielectric layer 111. In this way, the region of the dielectric layer where indium (In) having the high content may be disposed in the region of the dielectric layer that is adjacent to the interface, thereby improving the bonding strength of the interface between the dielectric layer and the internal electrode, and this region may act as a kind of semiconductor barrier hindering the movement of the electrons from the internal electrode to the dielectric layer or from the dielectric layer to the internal electrode, thereby improving both the capacitance and high-temperature load life of the multilayer electronic component.

Here, a content of indium (In) relative to nickel (Ni) may indicate the atomic ratio, and be calculated as (number of atoms of In)/(number of atoms of Ni)*100, and a unit of the content may be at %. In addition, the average content of indium (In) relative to nickel (Ni) may be an average value of the content of indium (In) relative to nickel (Ni) that is measured in at least five regions among the regions of the internal electrode 121 or 122 that is spaced apart by 2 nm from an interface thereof with the dielectric layer 111. Hereinafter, X may indicate the average content of indium (In) relative to nickel (Ni) in the region of the internal electrode 121 or 122 spaced apart by 2 nm from an interface thereof with the dielectric layer 111.

In a case in which X is less than 0.45 at %, the high-temperature load life of the multilayer electronic component may be lower while its capacitance is higher compared to a case in which X is zero at %. Therefore, X may be 0.45 at % or more, and may be 0.67 at % or more to further improve the capacitance and high-temperature load life of the multilayer electronic component.

On the other hand, in a case in which X is more than 1.39 at %, the capacitance of the multilayer electronic component may be lower. Therefore, X may be 1.39 at % or less, and may be 1.14 at % or less to further improve the capacitance of the multilayer electronic component.

Accordingly, X may be 0.45 at % or more and 1.39 at % or less, and may be 0.67 at % or more and 1.14 at % or less.

Referring to FIG. 6, the following may be an example of a method of measuring X: X may be measured by polishing the multilayer electronic component to its center in the second direction to expose its cross sections in the first and third directions, then selecting five regions X1, X2, X3, X4, and X5 of the internal electrode 121 or 122, each spaced apart by 2 nm from the interface IF with the dielectric layer 111, performing a quantitative analysis of indium (In) and nickel (Ni) by using the STEM-EDS in each of the five regions X1, X2, X3, X4, and X5 to acquire a content value of indium (In) relative to nickel (Ni), and then acquiring an average value of these values. In addition, a more generalized average value may be acquired by selecting four different internal electrodes, and then measuring five regions in each internal electrode to thus acquire an average value of a total of twenty measured values.

In addition, the interface IF between the dielectric layer 111 and the internal electrode 121 or 122 may indicate the point at which the contrast of the Fresnel fringes on both the sides of the interface is changed to be almost symmetrical on both sides of the interface when the focus is changed by observing the Fresnel fringes, i.e. the lines appearing on both the sides by using the scanning transmission electron microscope (STEM).

In an exemplary embodiment, the internal electrode 121 or 122 may include nickel (Ni) and indium (In), and at least some of indium (In) included in the internal electrode 121 or 122 may exist in a form of its alloy with nickel (Ni). Accordingly, the energy and surface tension in a grain boundary of nickel (Ni) may be reduced to improve connectivity in the internal electrode and reduce deviation in the thickness of the internal electrode. It is possible to check whether nickel (Ni) and indium (In) exist in the form of the alloy by checking whether a peak position of nickel (Ni) is shifted when analyzed by X-ray diffraction (XRD). For a specific example, it is possible to check whether the peak position of nickel (Ni) is shifted by pulverizing the inner electrode of the multilayer electronic component to acquire its powder and then analyzing the powder by the X-ray diffraction (XRD).

Meanwhile, the internal electrode 121 or 122 may include other metals other than nickel (Ni), indium (In) and nickel (Ni)-indium (In). For example, the internal electrode 121 or 122 may further include at least one of copper (Cu), palladium (Pd), silver (Ag), gold (Au), platinum (Pt), tin (Sn), aluminum (Al), titanium (Ti), or an alloy thereof.

In an exemplary embodiment, an average content of indium (In) included in R may be higher than an average content of indium (In) included in a region other than R in the internal electrode or the dielectric layer when R indicates a region within 2 nm from the interface IF between the internal electrode and the dielectric layer. In addition, the average content of indium (In) included in R may be twice or more than the average content of indium (In) included in the region other than R in the internal electrode or the dielectric layer.

Referring to FIG. 6, R indicates a region including R1, which is a region of the dielectric layer 111 that is within 2 nm from the interface IF with the internal electrode, and R2, which is a region of the internal electrode 121 or 122 that is within 2 nm from the interface IF with the dielectric layer. The average content of indium (In) included in R may be higher than the average content of indium (In) included in the region other than R in the internal electrode or the dielectric layer, thereby further improving the bonding strength of the interface between the dielectric layer and the internal electrode, and further improving an effect of acting as a kind of semiconductor barrier hindering the movement of electrons from the internal electrode to the dielectric layer or from the dielectric layer to the internal electrode to improve both the capacitance and high-temperature load life of the multilayer electronic component. Here, an average content of indium (In) included in R1 may be higher than an average content of indium (In) included in a region other than R1, and may be twice or more. In addition, an average content of indium (In) included in R2 of the internal electrode may be higher than an average content of indium (In) included in a region other than R2, and may be twice or more.

Figure 7A:
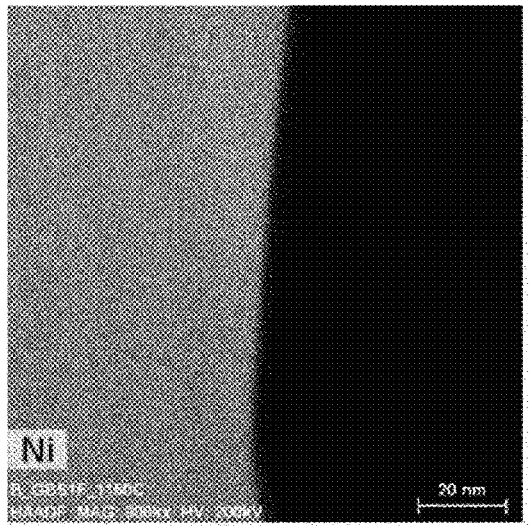
FIGS. 7A to 7C are images acquired by analyzing an interface between an internal electrode and a dielectric layer by using an energy-dispersive X-ray spectroscopy (STEM-EDS) according to an exemplary embodiment.
Figure 7B:
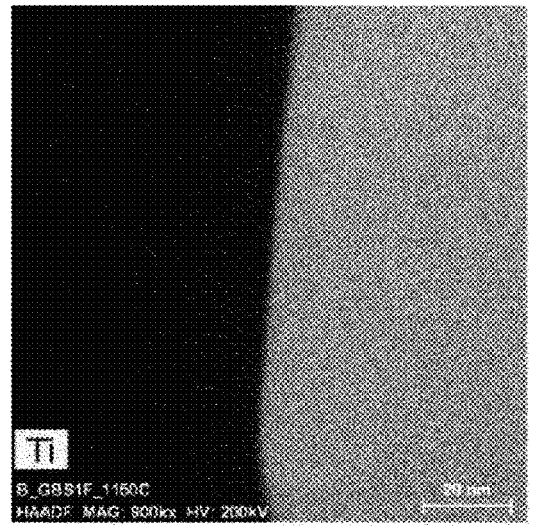
Figure 7C:
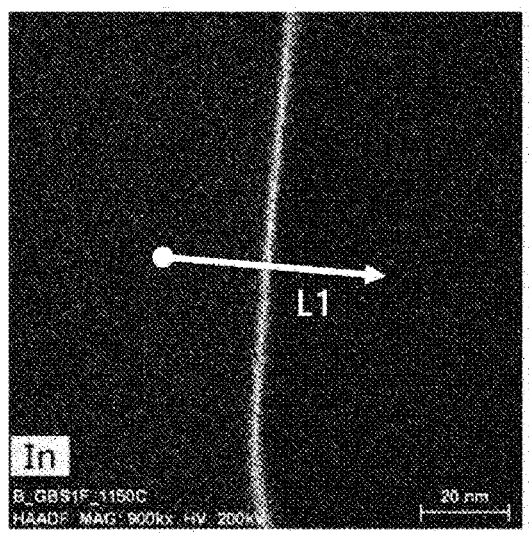

FIGS. 7A to 7C are images acquired by analyzing the interface between the internal electrode and the dielectric layer by using the energy-dispersive X-ray spectroscopy (STEM-EDS) according to an exemplary embodiment, FIG. 7A is an image acquired by mapping the nickel (Ni) element by using the STEM-EDS, FIG. 7B is an image acquired by mapping the titanium (Ti) element by using the STEM-EDS, and FIG. 7C is an image acquired by mapping the indium (In) element by using the STEM-EDS. Referring to FIGS. 7A and 7B, it may be seen that the dielectric layer and the internal electrode are clearly distinguished from each other based on a content of nickel (Ni) and a content of titanium (Ti), and referring to FIG. 7C, it may be seen that the high content of indium (In) appears in the interface between the dielectric layer and the internal electrode.

Figure 8A:
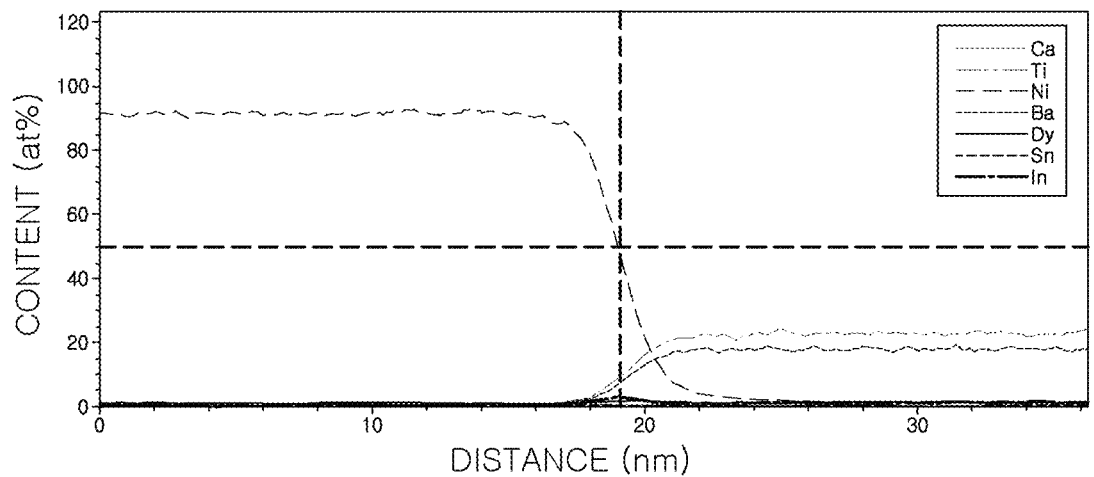
FIG. 8A is a result of a line profile performed along L1 indicated in FIG. 7C by using the STEM-EDS.
Figure 8B:
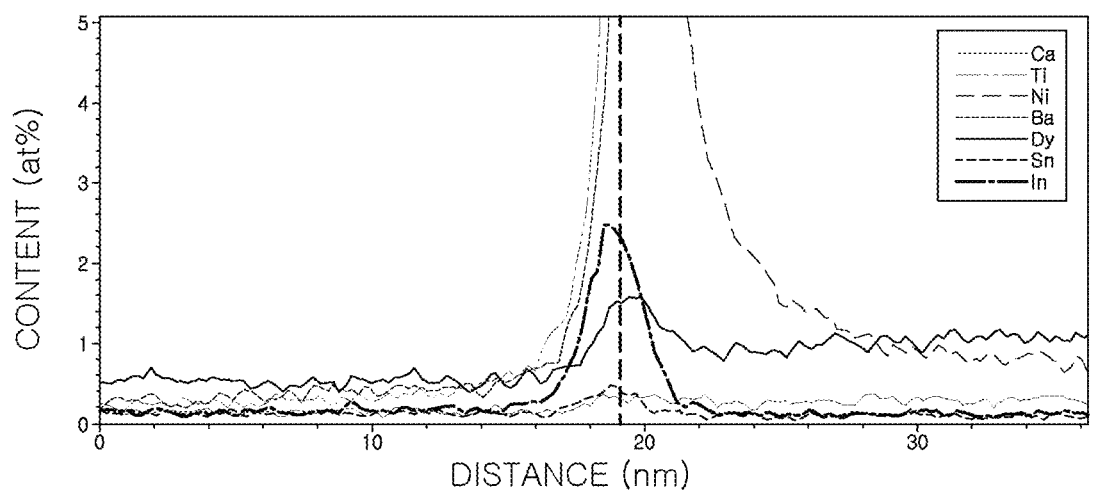
FIG. 8B is a graph in which a portion of FIG. 8A is enlarged.

It is possible to more quantitatively analyze a change in a content of an element based on its position by performing a line profile analysis along L1 shown in FIG. 6 or 7C, which is a line in a direction perpendicular to the interface between the dielectric layer and the internal electrode, by using the STEM-EDS. Referring to FIG. 8, which is a result of the line profile analysis performed along L1 shown in FIG. 7C, by using the STEM-EDS, it may be seen that a peak value of the content of indium (In), dysprosium (Dy), or tin (Sn) is detected in the region adjacent to the interface between the dielectric layer and the internal electrode.

In addition, the peak value of the content of indium (In) may be detected in a region where the content of nickel (Ni) is more than 50 at % and 90 at % or less, which may be due to the diffusion of indium (In) included in the conductive paste for the internal electrode into the dielectric layer. Therefore, in an exemplary embodiment, the peak value of the content of indium (In) may be detected in the region where the content of nickel (Ni) is more than 50 at % and 90 at % or less when performing the line profile analysis on the region adjacent to the interface IF in the direction perpendicular to the interface between the dielectric layer and the internal electrode by using the STEM-EDS. In addition, the peak value of the content of tin (Sn) may also be detected in a region where the content of nickel (Ni) is more than 50 at % and 90 at % or less. Here, the line profile analysis may be performed using the STEM-EDS.

On the other hand, the peak value of the content of dysprosium (Dy) may be detected in a region where the content of nickel (Ni) is 10 at % or more and less than 50 at %, which may be due to diffusion of dysprosium (Dy) added to the ceramic green sheet into the internal electrode. Therefore, in an exemplary embodiment, the peak value of the content of dysprosium (Dy) can be detected in the region where the content of nickel (Ni) is 10 at % or more and less than 50 at % when performing the line profile analysis on the region adjacent to the interface IF in the direction perpendicular to the interface between the dielectric layer and the internal electrode by using the STEM-EDS. Here, the line profile analysis may be performed using the STEM-EDS.

Meanwhile, a content of an element included in the center of the internal electrode 121 or 122 may not be particularly limited. However, for example, an average content of indium (In) relative to nickel (Ni) in the center of the internal electrode 121 or 122 may be 0.05 at % or more and 0.8 at % or less. In addition, an average content of tin (Sn) relative to nickel (Ni) in the center of the internal electrode 121 or 122 may be 0.02 at % or more and 0.42 at % or less. Here, the center of the internal electrode 121 or 122 may indicate a region thereof spaced apart by 20 nm or more from the interface IF between the internal electrode and the dielectric layer.

In addition, a content of an element included in the center of the dielectric layer 111 may not be particularly limited. However, for example, an average content of indium (In) relative to titanium (Ti) in the center of the dielectric layer 111 may be 0.15 at % or more and 1.8 at % or less. In addition, an average content of tin (Sn) relative to titanium (Ti) in the center of the dielectric layer 111 may be 0.01 at % or more and 0.2 at % or less. Here, the center of the dielectric layer 111 may indicate a region thereof spaced apart by 20 nm or more from the interface IF between the internal electrode and the dielectric layer.

In an exemplary embodiment, the internal electrode 121 or 122 may include a ceramic particle, and the ceramic particle may include indium (In).

The ceramic particle added to the conductive paste for the internal electrode may be trapped in the internal electrode after the sintering, and the ceramic particle included in the internal electrode 121 or 122 may then reduce a difference in a sintering-initiation temperature between the dielectric layer and the internal electrode. In addition, indium (In) may be added to the conductive paste for the internal electrode, and the ceramic particle included in the internal electrode 121 or 122 may thus include indium (In).

Here, indium (In) may be mainly distributed in a surface of the ceramic particle, which is an interface between the ceramic particle and the internal electrode, as in the interface IF between the internal electrode and the dielectric layer. Therefore, a content of indium (In) included in the surface of the ceramic particle may be higher than a content of indium (In) included in the inside of the ceramic particle, and the average content of indium (In) relative to titanium (Ti) in the surface of the ceramic particle may satisfy 0.3 at % or more. In addition, the average content of indium (In) relative to titanium (Ti) in the surface of the ceramic particle may be 0.3 at % or more and 3.8 at % or less.

Figure 9A:
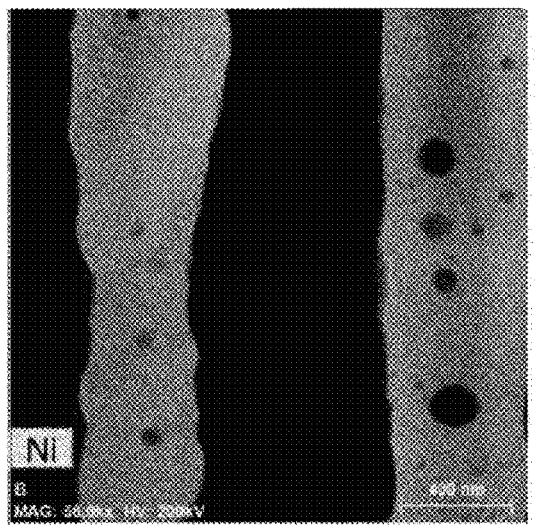
FIGS. 9A to 9C are images acquired by analyzing an interface between an internal electrode and a dielectric layer by using a STEM-EDS according to an exemplary embodiment of the present disclosure.
Figure 9B:
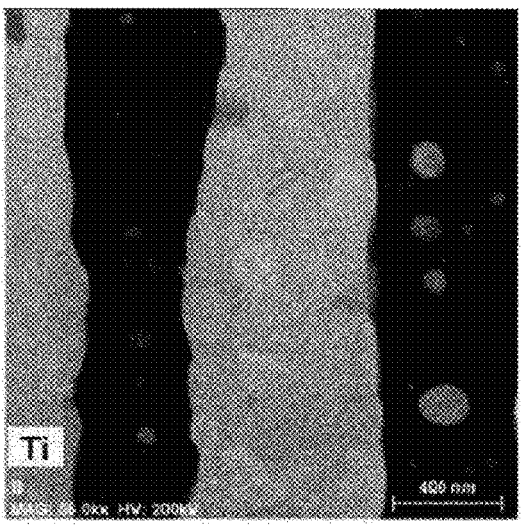
Figure 9C:
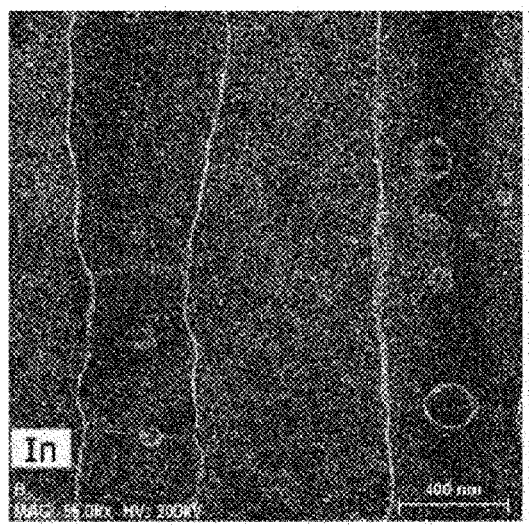

FIGS. 9A to 9C are images acquired by analyzing the interface between the internal electrode and the dielectric layer by using the STEM-EDS according to an exemplary embodiment of the present disclosure, FIG. 9A is an image acquired by mapping the nickel (Ni) element by using the STEM-EDS, FIG. 9B is an image acquired by mapping the titanium (Ti) element by using the STEM-EDS, and FIG. 9C is an image acquired by mapping the indium (In) element by using the STEM-EDS. Referring to FIGS. 9A and 9B, it may be seen that the ceramic particle is trapped in the internal electrode. In addition, referring to FIG. 9C, it may be seen that the high content of indium (In) appears in the surface of the ceramic particle, and the content of indium (In) included in the surface of the ceramic particle is similar to the content of indium (In) included in the interface IF between the internal electrode and the dielectric layer.

The following may be an example of a method of measuring the average content of indium (In) relative to titanium (Ti) in the surface of the ceramic particle: the average content of indium (In) relative to titanium (Ti) may be measured by polishing the multilayer electronic component to its center in the second direction to expose its cross sections in the first and third directions, then selecting five points in an interface between one of the ceramic particles trapped in the internal electrode 121 or 122 and the internal electrode, performing a quantitative analysis of titanium (Ti) and indium (In) at the above five points by using the STEM-EDS to acquire content values of indium (In) relative to titanium (Ti), and then finding an average value of these values. In addition, a more general average value may be acquired by selecting four different ceramic particles among the trapped ceramic particles, and then measuring five regions in each interface between the ceramic particle and the internal electrode to thus acquire an average value of a total of twenty measured values.

Meanwhile, an average thickness to of the internal electrode 121 or 122 does not need to be particularly limited, and may be arbitrarily set based on the desired characteristic or usage of the multilayer electronic component. For a specific example, the average thickness te of the internal electrode 121 or 122 may be 300 nm or more and 3 μm or less. In addition, the average thickness te of at least one of the plurality of internal electrodes 121 or 122 may be 300 nm or more and 3 μm or less.

The thickness of the internal electrode 121 or 122 may indicate a size of the internal electrode 121 or 122 in the first direction. The average thickness te of the internal electrode may be measured by scanning the cross sections of the body 110 in the first and second directions by using the scanning electron microscope (SEM) with the magnification of 10,000. In more detail, an average thickness value of the internal electrode may be acquired by averaging the thickness of one internal electrode measured at a plurality of points, for example, at thirty equally spaced points in the second direction. The thirty equally spaced points may be designated in the capacitance formation part Ac. In addition, it is possible to acquire a more general average thickness of the internal electrode 121 or 122 when measuring its average value by extending a measurement target of the average value to ten internal electrodes 121 or 122.

In an exemplary embodiment, $\sigma te/te$ may satisfy 0.2 or less when te indicates the average thickness of the internal electrode 121 or 122 and $\sigma te$ indicates a standard deviation in the thickness of the internal electrode 121 or 122. That is, a coefficient of variation CV in the thickness of the internal electrode may be 0.2 or less, which may indicate that thickness uniformity of the internal electrode is within 20%. In addition, $\sigma te/te$ may be 0.18 or less. In addition, the standard deviation $\sigma te$ in the thickness of the internal electrode 121 or 122 may be within ±70 nm.

When $\sigma te/te$ is 0.2 or less, it is possible to secure the thickness uniformity of the internal electrode 121 or 122 to thus prevent a phenomenon in which stress is unevenly applied to the internal electrode 121 or 122 and electrical field is concentrated thereon, thereby improving the reliability of the multilayer electronic component.

The standard deviation $\sigma te$ in the thickness of the internal electrode may be measured by subtracting the average thickness te of the internal electrode from the respective thicknesses of the internal electrode that are measured at thirty equally spaced points in the second direction for measuring the average thickness te of the internal electrode 121 or 122, then squaring the same, calculating an average value of these values to acquire a variance value, and then taking a square root of the variance value.

In an exemplary embodiment, the connectivity in the internal electrode 121 or 122 may be 85% or more. In addition, the connectivity in the internal electrode 121 or 122 may be 90% or more.

Figure 10:
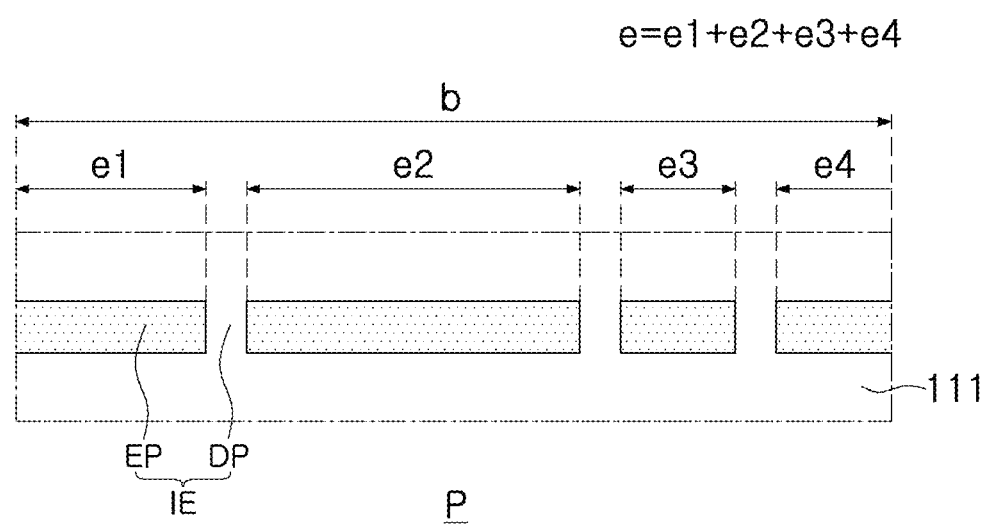
FIG. 10 is an enlarged view of a region P of FIG. 2 illustrating a method of measuring connectivity in the internal electrode.

FIG. 10 is a view illustrating definition of the connectivity in the internal electrode. Referring to FIG. 10, the internal electrode IE may include a plurality of conductive parts EP and a disconnection part DP disposed between the adjacent conductive parts EP. When b indicates a total length of the internal electrode IE and e1, e2, e3, and e4 respectively indicate lengths of the plurality of conductive parts EP, a ratio of sum (e=e1+e2+e3+e4) of the lengths of the plurality of conductive parts EP to the total length b of the internal electrode IE may be defined as the connectivity in the internal electrode.

The connectivity in the internal electrode may be measured by scanning the cross sections of the body 110 in the first and second directions by using the scanning electron microscope with the magnification of 10,000. In more detail, the connectivity in the internal electrode may indicate an average value acquired by measuring the connectivity in the internal electrode in each of ten internal electrodes 121 or 122 in the above image.

The external electrode 131 or 132 may be disposed on the third surface 3 or fourth surface 4 of the body 110.

The external electrode 131 or 132 may be the first or second external electrode 131 or 132 disposed on the third or fourth surface 3 or 4 of the body 110, and connected to the first or second internal electrode 121 or 122.

This exemplary embodiment describes that the multilayer electronic component 100 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity such as the metal, may use a specific material determined in consideration of an electrical characteristic, a structural stability or the like, and may have a multilayer structure.

For example, the external electrode 131 or 132 may include an electrode layer 131a or 132a disposed on the body 110 and a plating layer 131b or 132b formed on the electrode layer 131a or 132a.

For a more specific example of the electrode layer 131a or 132a, the electrode layer 131a or 132a may be a fired electrode including a conductive metal and glass, or a resin-based electrode including the conductive metal and resin.

Alternatively, the electrode layer 131a or 132a may be formed by sequentially disposing the fired electrode and the resin-based electrode on the body. Alternatively, the electrode layer 131a or 132a may be formed by transferring a sheet including the conductive metal to the body or by transferring the sheet including the conductive metal to the fired electrode. Alternatively, the electrode layer 131a or 132a may be formed of a plating layer or may be formed by using a deposition method such as a sputtering method or atomic layer deposition (ALD).

The conductive metal included in the electrode layer 131a or 132a may use a material having excellent electrical conductivity, and is not particularly limited. For example, the conductive metal may be at least one of nickel (Ni), copper (Cu), or an alloy thereof.

The plating layer 131b or 132b may serve to improve a mount characteristic of the multilayer electronic component. The plating layer 131b or 132b is not limited to a particular type, may include at least one of nickel (Ni), tin (Sn), palladium (Pd) or an alloy thereof, or may include a plurality of layers.

For a more specific example, the plating layer 131b or 132b may be a nickel (Ni) plating layer or a tin (Sn) plating layer, may include the nickel (Ni) plating layer and the tin (Sn) plating layer sequentially formed on the electrode layer 131a or 132a, or may include the tin (Sn) plating layer, the nickel (Ni) plating layer and the tin (Sn) plating layer sequentially formed on the electrode layer 131a or 132a. Alternatively, the plating layer 131b or 132b may include the plurality of nickel (Ni) plating layers or the plurality of tin (Sn) plating layers. Alternatively, the plating layer 131b or 132b may include the nickel (Ni) plating layer and the palladium (Pd) plating layer sequentially formed on the electrode layer 131a or 132a.

The multilayer electronic component 100 may not need to be limited to a particular size. The multilayer electronic component according to the present disclosure may be advantageous in its smaller size and higher capacitance, and thus be applied to a small-sized information technology (IT) product. In addition, the multilayer electronic component may secure the higher reliability in various environments, and thus be applied to a small-sized automotive electric product that requires higher reliability.

Hereinafter, the present disclosure is described in more detail based on an inventive example. However, the inventive example is provided to assist in better understanding of the present disclosure, and the scope of the present disclosure is not limited by the inventive example.

Inventive Example

A sample chip is prepared by stacking the ceramic green sheets, on each of which the paste for the internal electrode is applied, cutting and sintering the same to form the body, then applying a paste for the external electrode on the body, and sintering the same.

Here, for each test number, the sample chip is prepared by changing the content of indium (In) relative to nickel (Ni) powder particles included in the paste for the internal electrode, and indium (In) is not added to the paste for the internal electrode of test no. 1.

In addition, the ceramic green sheet is prepared by adding the organic solvent, the binder, a dispersant, or the like to barium titanate ($BaTiO_3$) powder particles, and indium (In) is not added to the ceramic green sheet.

The sample chip is polished to its center in the second direction to expose its cross sections in the first and third directions. As shown in FIG. 4, a sliced sample is then prepared by performing a microsampling processing method using a focused ion beam (FIB) each on a central region of the sample chip disposed in its center in the width and thickness directions, an upper region adjacent to the upper cover part, and a lower region adjacent to the lower cover part.

The sliced sample is processed to have a thickness of 60 nm or less. Meanwhile, a damaged layer on a surface of the sample that is formed during the FIB processing is removed by argon (Ar) beam ion milling.

Four regions adjacent to the interface between the internal electrode and the dielectric layer are selected from the sliced sample prepared as described above, and observed using the scanning transmission electron microscope (STEM). Here, the four regions above are selected to include different internal electrodes.

For each of the four regions, five interfaces that are substantially perpendicular to the cross section of the sliced sample are found. Meanwhile, the interface substantially perpendicular to the cross section of the sliced sample is found as follows. The interface that is substantially perpendicular to the cross section of the sliced sample is determined as an interface at which the contrast of the Fresnel fringes is changed to be almost symmetrical on both sides of the interface when the focus is changed by observing the Fresnel fringes, i.e. the lines appearing on both the sides, by using the scanning transmission electron microscope (STEM).

In addition, in performing the STEM analysis, an ARM-200F (manufactured by JEOL) is used as the scanning transmission electron microscope, and an acceleration voltage is 200 kV. In addition, oxford EDS is used as energy-dispersive X-ray spectroscopy (EDS) equipment.

For each of the four regions, the quantitative analyses of titanium (Ti) and indium (In) are performed on the five points Y1, Y2, Y3, Y4, and Y5 of the dielectric layer, each spaced apart by 2 nm from the five interfaces, by using the energy dispersive X-ray spectroscopy (EDS) to acquire the total of 20 data on the content of indium (In) relative to titanium (Ti), then acquiring an average value thereof to find the average content (or Y) of indium (In) relative to titanium (Ti) in the region of the dielectric layer that is spaced apart by 2 nm from the interface with the internal electrode. A diameter of an electron beam measurement probe is about 1 nm, and measurement time is 30 seconds. Meanwhile, quantitative correction from the acquired EDS spectra uses Cliff-Lorimer correction.

In addition, for each of the four regions, the quantitative analyses of nickel (Ni) and indium (In) are performed on the five points X1, X2, X3, X4, and X5 of the internal electrode, each spaced apart by 2 nm from the five interfaces, to acquire the total of 20 data on the content of indium (In) relative to nickel (Ni), then acquiring an average value thereof to find the average content (or X) of indium (In)

relative to nickel (Ni) in the region of the internal electrode that is spaced apart by 2 nm from the interface with the dielectric layer.

The capacitance is measured for 10 sample chips per each test number. Here, an average value for each test number is acquired by measuring the capacitance under conditions of AC voltage 1 Vrms and 1 kHz by using an automatic bridge type measuring device. The capacitance of test no. 1 is set as a reference value '1', and each of test nos. 2 through 9 describes a relative value of the capacitance of test no. 1.

Mean time to failure (MTTF) is measured for 10 sample chips per each test number. Here, an average value is acquired by conducting a high-temperature load test under conditions of 165° C. and 7.5 V, and determining time when an insulation resistance becomes 10 KΩ or less as failure time. The MTTF of test no. 1 is set as the reference value '1', and each of test nos. 2 through 9 describes a relative value of the MTTF of test no. 1.

The connectivity in the internal electrode is acquired by polishing the sample chip to its center in the second direction to expose its cross sections in the first and third directions, then selecting 10 internal electrodes in the central region of the sample chip disposed in its center in the width and thickness directions, as shown in FIG. 4, and describing an average value acquired by measuring the same. In addition, the average thickness to of the internal electrode and the standard deviation σte in thickness of the internal electrode are acquired by selecting one internal electrode in the central region, and then measuring the thickness of the internal electrode measured at thirty equally spaced points in the second direction.

TABLE 1

| Test No. | X (at %) | Y (at %) | Capacitance | MTTF | Connectivity in internal electrode | σte/te |
|---|---|---|---|---|---|---|
| 1* | 0 | 0 | 1 | 1 | 78% | 0.24 |
| 2* | 0.2 | 0.1 | 1.01 | 0.99 | 80% | 0.23 |
| 3* | 0.41 | 0.2 | 1.02 | 0.98 | 82% | 0.21 |
| 4 | 0.45 | 0.3 | 1.03 | 1.02 | 87% | 0.18 |
| 5 | 0.67 | 1.3 | 1.19 | 1.16 | 91% | 0.17 |
| 6 | 0.98 | 2.5 | 1.20 | 1.36 | 93% | 0.17 |
| 7 | 1.14 | 3.3 | 1.15 | 1.23 | 90% | 0.18 |
| 8 | 1.39 | 3.8 | 1.08 | 1.14 | 85% | 0.19 |
| 9* | 1.4 | 3.9 | 0.99 | 1.11 | 84% | 0.21 |
| 10* | 1.42 | 4.2 | 0.98 | 1.12 | 83% | 0.22 |
| 11* | 1.52 | 4.6 | 0.89 | 0.97 | 80% | 0.22 |

Referring to Table 1 above, it may be seen that test nos. 2, 3, 9, 10 and 11 in which the average content (Y) of indium (In) relative to titanium (Ti) is 0.2 at % or less or 3.9 at % or more in the region of the dielectric layer spaced apart by 2 nm from the interface with the internal electrode are inferior to test no. 1 in one or more of the capacitance and the MTTF.

On the other hand, it may be seen that each of test nos. 4 to 8, in which Y satisfies 0.3 at % or more and 3.8 at % or less, has a remarkable improvement compared to test no. 1 in both the capacitance and the MTTF. In addition, in test nos. 4 to 8, it may be seen that the connectivity in the internal electrode is 85%, the deviation in the thickness of the internal electrode is insignificant, and the internal electrode thus has excellent smoothness and thickness uniformity. Therefore, it may be seen that Y satisfies 0.3 at % or more and 3.8 at % or less.

In addition, it may be seen that each of test nos. 5 to 7, in which Y satisfies 1.3 at % or more and 3.3 at % or less, not only has both the capacitance and the MTTF improved compared to test no. 1, but also has the capacitance and the MTTF, each significantly improved by 15% or more. Therefore, it may be seen that Y satisfies 1.3 at % or more and 3.3 at % or less.

Referring to Table 1 above, it may be seen that test nos. 2, 3, 9, 10 and 11 in which the average content (X) of indium (In) relative to nickel (Ni) is 0.41 at % or less or 1.4 at % or more in the region of the internal electrode spaced apart by 2 nm from the interface with the dielectric layer are inferior to test no. 1 in one or more of the capacitance and the MTTF.

On the other hand, it may be seen that each of test nos. 4 to 8, in which X satisfies 0.45 at % or more and 1.39 at % or less, has a remarkable improvement compared to test no. 1 in both the capacitance and the MTTF. In addition, in test nos. 4 to 8, it may be seen that the connectivity in the internal electrode is 85%, the deviation in the thickness of the internal electrode is insignificant, and the internal electrode thus has excellent smoothness and thickness uniformity. Therefore, it may be seen that X satisfies 0.45 at % or more and 1.39 at % or less.

In addition, it may be seen that each of test nos. 5 to 7, in which X satisfies 0.67 at % or more and 1.14 at % or less, not only has both the capacitance and the MTTF improved compared to test no. 1, but also has the capacitance and the MTTF, each significantly improved by 15% or more. Therefore, it may be seen that X satisfies 0.67 at % or more and 1.14 at % or less.

As set forth above, the present disclosure may provide the multilayer electronic component having the higher reliability by controlling the content of indium (In) included in the region adjacent to the interface between the dielectric layer and the internal electrode.

The present disclosure may also provide the multilayer electronic component having the improved capacitance and high-temperature load life.

The present disclosure may also provide the multilayer electronic component having the improved connectivity in the internal electrode and the lower deviation in the thickness of the internal electrode.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including a dielectric layer and an internal electrode; and
    external electrodes disposed on the body,
    wherein an average content of indium (In) relative to titanium (Ti) satisfies 0.3 at % or more and 3.8 at % or less in a region of the dielectric layer that is spaced apart by 2 nm from an interface thereof with the internal electrode.

2. The component of claim 1, wherein the average content of indium (In) relative to titanium (Ti) satisfies 1.3 at % or more and 3.3 at % or less in the region of the dielectric layer that is spaced apart by 2 nm from the interface thereof with the internal electrode.

3. The component of claim 1, wherein an average content of tin (Sn) to titanium (Ti) satisfies 0.02 at % or more and 0.42 at % or less in the region of the dielectric layer that is spaced apart by 2 nm from the interface thereof with the internal electrode.

4. The component of claim 1, wherein an average content of dysprosium (Dy) relative to titanium (Ti) satisfies 3 at % or more and 7 at % or less in the region of the dielectric layer that is spaced apart by 2 nm from the interface thereof with the internal electrode.

5. The component of claim 1, wherein the dielectric layer includes $Ba(Ti_{1-z}In_z)O_3$ ($0<z<1$).

6. The component of claim 1, wherein an average content of indium (In) included in R1 is higher than an average content of indium (In) included in a region other than R1 in the dielectric layer, R1 indicating a region of the dielectric layer that is within 2 nm from the interface thereof with the internal electrode.

7. The component of claim 1, wherein an average content of indium (In) relative to nickel (Ni) satisfies 0.45 at % or more and 1.39 at % or less in a region of the internal electrode that is spaced apart by 2 nm from the interface thereof with the dielectric layer.

8. The component of claim 1, wherein an average content of indium (In) relative to nickel (Ni) satisfies 0.67 at % or more and 1.14 at % or less in a region of the internal electrode that is spaced apart by 2 nm from the interface thereof with the dielectric layer.

9. The component of claim 1, wherein the internal electrode includes nickel (Ni) and indium (In), and at least some of indium (In) included in the internal electrode exist in a form of its alloy with nickel (Ni).

10. The component of claim 1, wherein an average content of indium (In) included in R is higher than an average content of indium (In) included in a region other than R in the internal electrode or the dielectric layer, R indicating a region within 2 nm from the interface between the internal electrode and the dielectric layer.

11. The component of claim 1, wherein a peak value of a content of indium (In) is detected in a region where the content of nickel (Ni) is more than 50 at % and 90 at % or less when performing a line profile analysis on a region adjacent to the interface in a direction perpendicular to the interface between the dielectric layer and the internal electrode by using an energy-dispersive X-ray spectroscopy (STEM-EDS).

12. The component of claim 1, wherein a peak value of a content of dysprosium (Dy) is detected in a region where the content of nickel (Ni) is 10 at % or more and less than 50 at % when performing a line profile analysis on a region adjacent to the interface in a direction perpendicular to the interface between the dielectric layer and the internal electrode by using an energy-dispersive X-ray spectroscopy (STEM-EDS).

13. The component of claim 1, wherein the internal electrode includes a ceramic particle, and the ceramic particle includes indium (In).

14. The component of claim 13, wherein a content of indium (In) included in a surface of the ceramic particle is higher than a content of indium (In) included in the inside of the ceramic particle, and an average content of indium (In) relative to titanium (Ti) in the surface of the ceramic particle satisfies 0.3 at % or more.

15. The component of claim 1, wherein an average thickness of the dielectric layer is 300 nm or more and 10 µm or less.

16. The component of claim 1, wherein an average thickness of the internal electrode is 300 nm or more and 10 µm or less.

17. The component of claim 1, wherein σte/te satisfies 0.2 or less in which te indicates an average thickness of the internal electrode and σte indicates a standard deviation in the thickness of the internal electrode.

18. The component of claim 1, wherein the internal electrode includes a plurality of conductive parts and a disconnection part disposed between the adjacent conductive parts, and
connectivity in the internal electrode, which is a ratio of sum of lengths of the plurality of conductive parts to a total length of the internal electrode, is 85% or more.

19. A multilayer electronic component comprising:
a body including a dielectric layer and an internal electrode; and
external electrodes disposed on the body,
wherein an average content of indium (In) relative to nickel (Ni) satisfies 0.45 at % or more and 1.39 at % or less in a region of the internal electrode that is spaced apart by 2 nm from an interface thereof with the dielectric layer.

20. The component of claim 19, wherein the average content of indium (In) relative to nickel (Ni) satisfies 0.67 at % or more and 1.14 at % or less in the region of the internal electrode that is spaced apart by 2 nm from the interface thereof with the dielectric layer.

21. The component of claim 19, wherein an average content of indium (In) relative to nickel (Ni) at a center of the internal electrode is 0.05 at % or more and 0.8 at % or less.

22. The component of claim 19, wherein an average content of tin (Sn) relative to nickel (Ni) at a center of the internal electrode is 0.02 at % or more and 0.42 at % or less.

23. The component of claim 19, wherein the internal electrode includes a ceramic particle, and the ceramic particle includes indium (In).

24. The component of claim 23, wherein a content of indium (In) included in a surface of the ceramic particle is higher than a content of indium (In) included in the inside of the ceramic particle, and an average content of indium (In) relative to titanium (Ti) in the surface of the ceramic particle satisfies 0.3 at % or more.

* * * * *